UNITED STATES PATENT OFFICE.

ERWIN E. A. G. MEYER, OF DETROIT, MICHIGAN, ASSIGNOR TO MORGAN & WRIGHT, A CORPORATION OF MICHIGAN.

PROCESS FOR REGULATING TREATMENT OF VULCANIZABLE PLASTICS.

1,247,985.   Specification of Letters Patent.   Patented Nov. 27, 1917.

No Drawing. Continuation of application Serial No. 778,130, filed July 9, 1913. This application filed January 31, 1917. Serial No. 145,654.

*To all whom it may concern:*

Be it known that I, ERWIN E. A. G. MEYER, a citizen of the United States, residing at Detroit, county of Wayne, and State of Michigan, have invented certain new and useful Improvements in Processes for Regulating Treatment of Vulcanizable Plastics, of which the following is a full, clear, and exact description.

This invention relates to processes for regulating the treatment of vulcanizable plastics. It is more particularly directed to a process for regulating the hot vulcanization of rubber in accordance with changes taking place therein.

The principal object of the invention is to make an accurate determination of the various stages of the treatment of the rubber by a heated vulcanizing or other medium so that a corresponding regulation of the medium applied in accordance with a predetermined standard may be made.

Briefly stated, the invention consists in applying a vulcanizing medium to a vulcanizable plastic article thereby causing an expansion of the plastic and regulating the application of the medium in accordance with the expansion. This application is a continuation of my former application Serial No. 778,130 filed July 9, 1913.

The invention is particularly applicable to the regulation of the vulcanization of molded articles. In carrying out the process in its preferred form, the rubber is confined in a mold to which has been attached a gage of any desired type adapted to record the expansion of the rubber. The heating medium at a vulcanizing temperature is then applied. The expansion of the rubber under the action of the vulcanizing medium, which is indicated on the gage, has been found ordinarily to take place at a varying rate; that is, for a given rise in temperature between different points on the temperature scale a corresponding expansion in the rubber will be noted. Such rate will also vary in accordance with the rubber compound used. The variation in the rate serves as an index to the various stages of vulcanization of the rubber. The series of rates of expansion may be determined for a given rubber compound and will serve as a standard by which to gage the extent of vulcanization and particularly to determine the point of most efficient vulcanization. The rubber has been found to reach this point of most efficient vulcanization ordinarily when the maximum rate of expansion has been reached. In carrying out the process using the standard mentioned, when it is noted that the rate is in accordance with a predetermined rate of expansion for a given rise in temperature it will be known that the vulcanization of the rubber has reached a certain state. If this state is that of most efficient vulcanization ordinarily the vulcanizing medium will be shut off. It will, of course, be understood however, that the rate reached may represent any desired state and any desired regulation of the heating medium may be made in accordance therewith.

The process outlined has been found to afford an accurate determination of the various stages of the treatment of the rubber so that corresponding regulation of the vulcanizing medium applied in accordance with the predetermined standard may be made.

As many apparently widely different embodiments of this invention may be made without departing from the spirit thereof, it is to be understood that I do not intend to limit myself to the specific form of the invention as set forth except as indicated in the appended claims.

Having thus described my invention what I claim and desire to protect by Letters Patent is

1. A process of treating a vulcanizable plastic which comprises applying a vulcanizing medium thereto thereby causing an expansion of said plastic and regulating the application of said vulcanizing medium in accordance with said expansion.

2. A process of treating a vulcanizable plastic which comprises applying a heating medium at a vulcanizing temperature thereto thereby causing an expansion of said plastic and regulating the application of said heating medium in accordance with said expansion.

3. A process of treating a vulcanizable plastic which comprises applying a heating medium at a vulcanizing temperature thereto thereby causing an expansion of said plastic at a varying rate and discontinuing said heating medium upon attaining a desired rate of expansion.

4. A process of treating a vulcanizable plastic which comprises placing the plastic in a mold, applying a heating medium thereto thereby causing an expansion of said plastic in said mold and regulating the heating of said plastic in accordance with the expansion thereof.

5. A process of treating a vulcanizable plastic which comprises placing the plastic in a mold, applying a heating medium at a vulcanizing temperature thereto thereby causing an expansion of said plastic at a varying rate and discontinuing said heating upon attaining a desired rate of expansion.

6. A process of treating vulcanizable plastic which comprises applying a heated medium thereto, thereby causing an expansion of said plastic and regulating the application of said heated medium in accordance with said expansion.

Signed at Detroit, Mich., this 26th day of January, 1917.

ERWIN E. A. G. MEYER.

Copies of this patent may be obtained for five cents each, by addressing the "Commissioner of Patents, Washington, D. C."